(12) United States Patent
Lee et al.

(10) Patent No.: US 12,555,149 B2
(45) Date of Patent: Feb. 17, 2026

(54) QUEUE MANAGEMENT DEVICE FOR PROVIDING INFORMATION ABOUT ACCESS WAITING SCREEN AND METHOD THEREOF

(71) Applicant: STCLab. Co., Ltd., Seoul (KR)

(72) Inventors: Sang Yeob Lee, Seoul (KR); Hyung Joon Park, Seoul (KR)

(73) Assignee: STCLab. Co., Ltd., Seoul (KR)

( * ) Notice: Subject to any disclaimer, the term of this patent is extended or adjusted under 35 U.S.C. 154(b) by 0 days.

(21) Appl. No.: 18/425,128

(22) Filed: Jan. 29, 2024

(65) Prior Publication Data
US 2024/0221043 A1 Jul. 4, 2024

Related U.S. Application Data

(63) Continuation of application No. PCT/KR2023/018933, filed on Nov. 22, 2023.

(30) Foreign Application Priority Data

Dec. 29, 2022 (KR) ........................ 10-2022-0189411

(51) Int. Cl.
*G06Q 30/0601* (2023.01)

(52) U.S. Cl.
CPC ..... *G06Q 30/0607* (2013.01); *G06Q 30/0605* (2013.01)

(58) Field of Classification Search
CPC ............. G06Q 30/0607; G06Q 10/087; G06Q 30/0605
See application file for complete search history.

(56) References Cited

U.S. PATENT DOCUMENTS 7,945,463 B2 * 5/2011 Sussman ................ G06Q 40/00
705/5
10,031,652 B1 * 7/2018 Yang ........................ G06N 7/00
(Continued)

FOREIGN PATENT DOCUMENTS

KR 10-1072612 B1 10/2011
KR 10-2013-0081990 A 7/2013
(Continued)

OTHER PUBLICATIONS

X. Deng, Z. Liu, J. Xie and H. Xiong, "Web System Upgrading with Transaction Failure and Strategic Customers," in IEEE Transactions on Systems, Man, and Cybernetics: Systems, vol. 44, No. 2, pp. 209-219, Feb. 2014, doi: 10.1109/TSMC.2012.2237027. (Year: 2014).*

(Continued)

*Primary Examiner* — Jeffrey A. Smith
*Assistant Examiner* — Latasha D Ramphal
(74) *Attorney, Agent, or Firm* — Studebaker Brackett PLLC

(57) ABSTRACT

Disclosed is a queue management device for providing information about an access waiting screen, and a method thereof. The device includes a communication unit that communicates with a client device and a target server, a memory in which at least one process for providing information to a waiting screen of the client device waiting to be accessed is stored, and a processor that operates according to the process. The processor provides waiting information of the client device to the waiting screen based on an access request previously received from another client device when receiving an access request for the target server from the client device through the communication unit, and provides additional service-related information to the waiting screen until the client device is allowed to access the target server.

7 Claims, 5 Drawing Sheets

(56) References Cited

U.S. PATENT DOCUMENTS

| | | | | |
|---|---|---|---|---|
| 2001/0049690 A1* | 12/2001 | McConnell | ............... | G07G 1/14 |
| 2003/0216969 A1* | 11/2003 | Bauer | .................... | G06K 17/00 |
| | | | | 705/22 |
| 2018/0157860 A1* | 6/2018 | Nair | ..................... | G06F 21/6218 |
| 2019/0385107 A1* | 12/2019 | Renfroe | ............. | G06Q 30/0641 |
| 2022/0108380 A1* | 4/2022 | Bilotta | ................ | G06Q 30/0607 |

FOREIGN PATENT DOCUMENTS

| | | |
|---|---|---|
| KR | 10-1654266 B1 | 9/2016 |
| KR | 10-2017-0090147 A | 8/2017 |
| KR | 10-1862563 B1 | 7/2018 |
| KR | 10-1998680 B1 | 7/2019 |
| KR | 10-2020-0111578 A | 9/2020 |
| KR | 10-2022-0001939 A | 1/2022 |
| KR | 10-2022-0133824 A | 10/2022 |
| WO | 2012/023708 A2 | 2/2012 |

OTHER PUBLICATIONS

"Notice of Preliminary Examination Result" Office Action issued in KR 10-2022-0189411; mailed by the Korean Intellectual Property Office on Jan. 30, 2023.
"Written Decision on Registration" Office Action issued in KR 10-2022-0189411; mailed by the Korean Intellectual Property Office on Mar. 21, 2023.

\* cited by examiner

QUEUE MANAGEMENT DEVICE FOR PROVIDING INFORMATION ABOUT ACCESS WAITING SCREEN AND METHOD THEREOF

CROSS-REFERENCE TO RELATED APPLICATIONS

The present application is a continuation of International Patent Application No. PCT/KR2023/018933, filed on Nov. 22, 2023, which is based upon and claims the benefit of priority to Korean Patent Application No. 10-2022-0189411 filed on Dec. 29, 2022. The disclosures of the above-listed applications are hereby incorporated by reference herein in their entirety.

BACKGROUND

Embodiments of the present disclosure described herein relate to a queue management device for providing information about an access waiting screen, and a method thereof.

As the number of concurrent users of a service server that provides a content service such as course registrations, concert reservations, and purchase events increases, the response speed of the service server providing the content service may decrease or the service may be interrupted.

A system may be composed of a WEB that provides a web page composed of a hypertext markup language (HTML), a web application server (WAS) that processes application program services for request messages delivered from the WEB, and a database that stores data capable of being provided in response to query statements.

In the above-mentioned system, when the number of concurrent users is overwhelming, a WEB response time may be delayed due to insufficient network bandwidth.

SUMMARY

Embodiments of the present disclosure provide a queue management device for providing information about an access waiting screen, and a method thereof.

Problems to be solved by the present disclosure are not limited to the problems mentioned above, and other problems not mentioned will be clearly understood by those skilled in the art from the following description.

According to an embodiment, a queue management device for providing information of an access waiting screen includes a communication unit, and a processor that provides waiting information to a waiting screen of a client device based on an access request already received from another client device when receiving a request for access to a target server is received from the client device through the communication unit, and provides additional information related to a service for product sales to the waiting screen until the access is permitted. The additional information includes an inventory quantity, an inventory exhaustion speed, and an expected inventory exhaustion time of an event product when the service is a service related to sales of the event product. The processor provides warning notification information indicating failure to purchase the event product, and a promotional code for inducing departure from a queue on the waiting screen when an expected waiting time included in the waiting information is longer than the expected inventory exhaustion time, removes the client device from the queue when acceptance of the promotional code is received from the client device, and plans an event product different from another alternative service based on an acceptance rate by an alternative service type, an event product, a gender, and an age, which are analyzed based on departure information collected depending on the acceptance, and an average time required to remain on standby, and determines a display time point of an alternative service.

According to an embodiment, a method performed by a processor of a device includes providing waiting information to a waiting screen of the client device based on an access request already received from another client device when a request of access to a target server is received from a client device, and providing additional information related to a product sales service to the waiting screen until the access is permitted. The additional information includes an inventory quantity, an inventory exhaustion speed, and an expected inventory exhaustion time of an event product when the service is a service related to sales of the event product. The processor provides warning notification information indicating failure to purchase the event product, and a promotional code for inducing departure from a queue on the waiting screen when an expected waiting time included in the waiting information is longer than the expected inventory exhaustion time, removes the client device from the queue when acceptance of the promotional code is received from the client device, and plans an event product different from another alternative service based on an acceptance rate by an alternative service type, an event product, a gender, and an age, which are analyzed based on departure information collected depending on the acceptance, and an average time required to remain on standby, and determines a display time point of an alternative service.

Besides, a computer program stored in a computer-readable recording medium for implementing the inventive concept may be further provided.

In addition, a computer-readable recording medium for recording a computer program for implementing the inventive concept may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
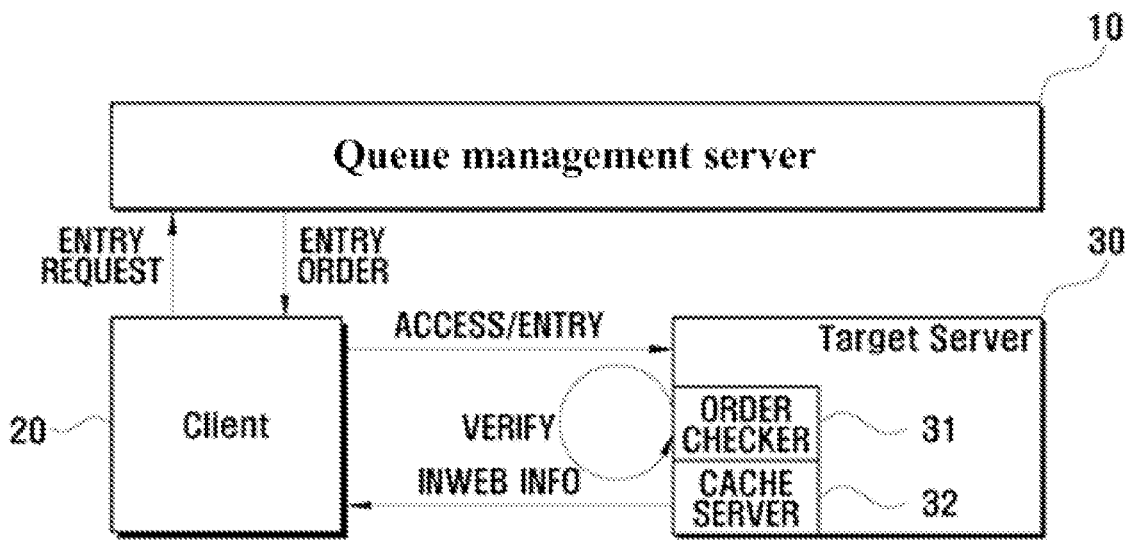
FIG. 1 is a diagram schematically showing a system for providing a queue management service, according to an embodiment of the present disclosure.

The same reference numerals denote the same elements throughout the present disclosure. The present disclosure does not describe all elements of embodiments. Well-known content or redundant content in which embodiments are the same as one another will be omitted in a technical field to which the present disclosure belongs. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, operating principles and embodiments of the present disclosure will be described with reference to the accompanying drawings.

In this specification, a "queue management device 100 for providing information about an access waiting screen (hereinafter, referred to as a "queue management device")" includes all various devices capable of providing results to a user by performing arithmetic processing. For example, the queue management device 100 according to an embodiment of the present disclosure may include all of a computer, a server device, and a portable terminal, or may be in any one form.

Here, for example, the computer may include a notebook computer, a desktop computer, a laptop computer, a tablet PC, a slate PC, and the like, which are equipped with a web browser.

The server device may be a server that processes information by communicating with an external device and may include an application server, a computing server, a database server, a file server, a game server, a mail server, a proxy server, and a web server.

For example, the portable terminal may be a wireless communication device that guarantees portability and mobility, and may include all kinds of handheld-based wireless communication devices such as a smartphone, a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-Code Division Multiple Access (WCDMA), and Wireless Broadband Internet terminal (Wibro) terminal, and a wearable device such as a timepiece, a ring, a bracelet, an anklet, a necklace, glasses, a contact lens, or a head-mounted device (HMD).

In this specification, "access" and "entry" may be understood to have the same meaning as each other.

FIG. 1 is a diagram schematically showing a system for providing a queue management service, according to an embodiment of the present disclosure.

A queue management server 10 may be located between a client device 20 and a target server 30 to manage the entry of the client device 20 into the target server 30.

The queue management server 10 may perform a procedure of blocking, detouring, and entry permission management for the client device 20 that requests an entry into the target server 30.

The blocking may refer to a procedure of transmitting blocking information to the client device 20 to block selection of a button (e.g., purchase and confirmation, or the like) for generating a specific action when the number of accesses per second is at a macro level.

The detouring may refer to a detour procedure of directly entering the target server 30 without waiting in a case of a specific policy or major client device even when a queue for waiting for entry to the target server 30 is present.

The entry permission management refers to normal standby management for an entry into the target server 30, and may refer to a procedure for managing the resource or status of the target server 30 that provides a content service by controlling the entry based on the number of allowable entries.

In this case, the number of allowable entries may refer to the number of users who are issued a key of the queue management server 10 and are capable of simultaneously entering a specific transaction (e.g., a login button, a purchase button, a payment button, or the like) of the target server 30. At this time, the number of users may actually mean the number of client devices 20 capable of entering the target server 30.

For example, when 50 people are allowed to enter the target server 30 that provides the product purchase service, and 55 people simultaneously select a purchase button for the same product, the queue management server 10 allows 50 people to enter the target server 10 at the same time, but may allow 5 people to be placed in the queue. Afterward, when the entry of 50 people into the target server 30 is completed and the issued key is retrieved, the retrieved key may be issued again to the five people placed in a queue such that the 50 people may enter the target server 30 sequentially.

In this case, users (users waiting for access) placed in the queue have no choice but to watch a waiting screen until access to the target server 30 is allowed. Conveniently, waiting information including the waiting number and waiting time of the corresponding client device was displayed on the waiting screen, thereby allowing users to determine when they would be able to use the service. In an embodiment of the present disclosure, the queue management server 10 displays not only waiting information but also additional service-related information on the waiting screen, allowing users to objectively determine whether to wait for or leave the queue. This will be more fully described later.

The client device 20 may be a terminal device of a user who wants to employ a service provided by the target server 30. For example, the user may purchase a specific product, may sign up for classes, or may reserve tickets for specific performances through his/her terminal.

The target server 30 may include an order checker 31 and a cache server 32. The order checker 31 may verify normal access by identifying a key of the client device 20, which is allowed to be entered (entered in order) by the queue management server 10. The cache server 32 may provide information necessary to generate additional service-related information to the waiting client device 20. This will be more fully described later.

Moreover, although not shown in FIG. 1, the target server 30 may include a web server, a web application server (hereinafter referred to as "WAS"), and a database (DB). In this case, the database may also be referred to as a "database management system (DBMS)".

A web server may refer to a server that mainly processes requests from a client device such as a web browser or a web crawler based on HTTP protocol. When the web server receives an HTTP request, the web server may reply with an HTTP response.

For example, the web server may receive a file path name and may return static file content (html, jpeg, css, or the like) that matches the path.

The web server may deliver a request for providing dynamic content to the WAS, may receive the processed result from the WAS, and may deliver the result to the client device.

The WAS refers to an application server using HTTP, and may include a container that makes dynamic data available to a web server specialized in processing static HTTP data.

The WAS may be an application server for providing dynamic content that requires database inquiry or various logic processing. The WAS may be middleware (a software engine) that executes applications on computers or devices through HTTP. The WAS may also be named a web container or servlet container. In this case, the container may refer to software capable of executing JSP and Servlet.

The WAS may be applied in a distributed environment for processing functions such as distributed transactions, security, messaging, and thread processing.

In detail, the WAS may implement program execution environments, database access functions, and multiple transaction management functions. The transaction may refer to a logical unit of work.

The WAS may receive the corresponding data from the database at the request of a user, may generate results in real time according to business logic, and may provide the results. The WAS may include a plurality of web application servers. The number of web application servers respectively applied to the queue management servers 10 may be different.

The database may refer to a structure that stores and manages data. In this case, the database may reply the corresponding data at the request of the WAS.

Figure 2:
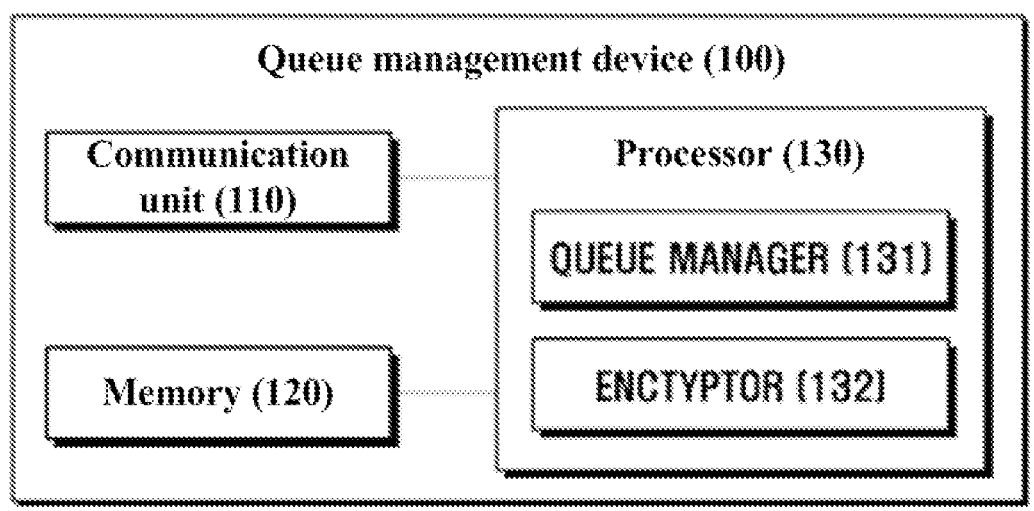
FIG. 2 is a block diagram of a queue management device for providing information on an access waiting screen, according to an embodiment of the present disclosure.

FIG. 2 is a block diagram of a queue management device 100 (hereinafter, referred to as a "queue management device") for providing information on an access waiting screen, according to an embodiment of the present disclosure. The queue management device 100, which will be described with reference to FIG. 2, may be the queue management server 10 described above with reference to FIG. 1.

Referring to FIG. 2, the queue management device 100 may include a communication unit 110, a memory 120, and a processor 130. The processor 130 may include a queue manager 131 and an encryptor 132.

However, in some embodiments, each of the queue management device 100 and the processor 130 may include fewer or more components than the components illustrated in FIG. 2.

The communication unit 110 may include one or more modules that enable wireless or wired communication between the queue management device 100 and the client device 20, between the queue management device 100 and the target server 30, between the queue management device 100 and a communication network, or between the queue management device 100 and an external server (not shown). For example, the communication unit 110 may include at least one of a wired communication module, a wireless communication module, a short-range communication module, and a location information module.

Various types of communication networks may be used. For example, wireless communication methods such as wireless LAN (WLAN), Wi-Fi, Wibro, Wimax, High Speed Downlink Packet Access (HSDPA), and the like or wired communication methods such as Ethernet, xDSL (ADSL or VDSL), Hybrid Fiber Coax (HFC), Fiber to The Curb (FTTC), Fiber To The Home (FTTH), and the like may be used in a communication network.

In the meantime, the communication network is not limited to the communication method described above, and may include all types of communication methods widely known or to be developed in the future in addition to the above communication methods.

Here, in addition to various wired communication modules such as a Local Area Network (LAN) module, a Wide Area Network (WAN) module, or a Value Added Network (VAN) module, the wired communication module may include a variety of cable communication modules such as Universal Serial Bus (USB), High Definition Multimedia Interface (HDMI), Digital Visual Interface (DVI), recommended standard232 (RS-232), power line communication, or plain old telephone service (POTS).

Here, the wireless communication module may include a wireless communication module for supporting various wireless communication methods such as Global System for Mobile (GSM) communication, Code Division Multiple Access (CDMA), Wideband Code Division Multiple Access (WCDMA), Universal Mobile Telecommunication System (UMTS), Time Division Multiple Access (TDMA), Long Term Evolution (LTE), 4G, 5G, and 6G in addition to a wifi module and Wireless broadband module.

The short-range communication may be used for short range communication, and may support short-range communication by using at least one of Bluetooth™, radio frequency identification (RFID), infrared data association (IrDA), ultra wideband (UWB), ZigBee, near field communication (NFC), Wireless-Fidelity (Wi-Fi), Wi-Fi Direct, and wireless universal serial bus (Wireless USB) technologies.

At least one process may be stored in the memory 120 to provide information to the waiting screen of the client device waiting to be accessed.

The memory 120 may store data supporting various functions of the queue management device 100 and a program for the operation of the processor 130, may store pieces of input/output data (e.g., music files, still images, videos, and the like), and may store a plurality of application programs (or applications) running on the queue management device 100, data for operations of the queue management device 100, and commands. At least part of the application programs may be downloaded from an external server through wireless communication.

The memory 120 may include the type of a storage medium of at least one of a flash memory type, hard disk type, a solid state disk (SSD) type, a silicon disk drive (SDD) type, a multimedia card micro type, a memory of a card type (e.g., SD memory, XD memory, or the like), a random access memory (RAM), a static random access memory (SRAM), a read-only memory (ROM), an electrically erasable programmable read-only memory (EE- PROM), a programmable read-only memory (PROM), a magnetic memory, a magnetic disk, and an optical disc. Furthermore, the memory 120 may be separate from the queue management device 100, but may be a database connected by wire or wirelessly.

The processor 130 may execute the above-described operations by using a memory that stores data regarding an algorithm for controlling operations of components within the queue management device 100, or a program for implementing the algorithm, and data stored in the memory. In this case, each of the memory 120 and the processor 130 may be implemented as separate chips. Alternatively, the memory 120 and the processor 130 may be implemented as a single chip.

The queue manager 131 of the processor 130 may perform a procedure of blocking, detouring, and entry permission management for a user terminal 200 that requests the entry into the target server 30. In detail, among access requests received simultaneously from the plurality of client devices 20, the queue manager 131 may allow entry for requests that correspond to the number of entry allowed for the target server 30, and may assign an order to the remaining requests by placing the remaining requests in a queue. Moreover, afterward, when the access request for the entry into the target server 30 is completely processed, access requests in the queue may be allowed to be entered sequentially.

The encryptor 132 of the processor 130 may perform key issuance and key retrieval functions. In detail, the encryptor 132 may only issue keys to access requests corresponding to the number of entries allowed for the target server 30. Afterwards, when the client device 20, which received the key, completely enters the target server 30, the key issued to the corresponding access request may be retrieved. Moreover, the retrieved key may be sequentially issued to access requests in the queue.

In other words, when the target server 30 is capable of being entered, the processor 130 may issue a key through the encryptor 132. When the target server 30 is incapable of being entered, the processor 130 may place a queue for the client device 20 through the queue manager 131 and may call a waiting screen.

In this case, when the processor 130 receives an entry request from the client device 20 regardless of whether the target server 30 is entered, the processor 130 may deliver the entry request to WAS of the target server 30 such that the entry request is capable of being recorded.

Furthermore, the processor 130 may control one of the components described above or the combination of the components to implement various embodiments of the present disclosure described below with reference to FIGS. 3 to 5 on the queue management device 100.

Although not illustrated, the queue management device 100 according to an embodiment of the present disclosure may further include an output unit and an input unit.

The output unit may display a user interface (UI) for providing an entry management procedure and result to the target server. The output unit may output any type of information generated or determined by the processor 130 and any type of information received by the communication unit 110.

The output unit may include at least one of a liquid crystal display (LCD), a thin film transistor-liquid crystal display (TFT LCD), an organic light emitting diode (OLED), a flexible display, and a 3D display. Some display modules thereof may be implemented with a transparent display or a light-transmitting display such that a user sees the outside through the display modules. This may be called a transparent display module, and a typical example of the transparent display module includes a transparent OLED (TOLED).

The input unit may receive information entered by the user. The input unit may include keys and/or buttons on a user interface for receiving information entered by a user, or physical keys and/or buttons. A computer program for controlling a display according to an embodiment of the present disclosure may be executed depending on a user input through an input unit.

Hereinafter, referring to FIGS. 3 to 5, a method in which the queue management device 100 provides additional service-related information along with waiting information to the client device 20 (placed in the queue) waiting to enter the target server 30 will be described in detail. Moreover, hereinafter, it is described that the target server 30 provides a product sales service and the client device 20 requests access to the target server 30 to purchase a product, but is not limited thereto. For example, it may be applied to applications for a specific event (including periodic events, regular events, and one-time events).

Figure 3:
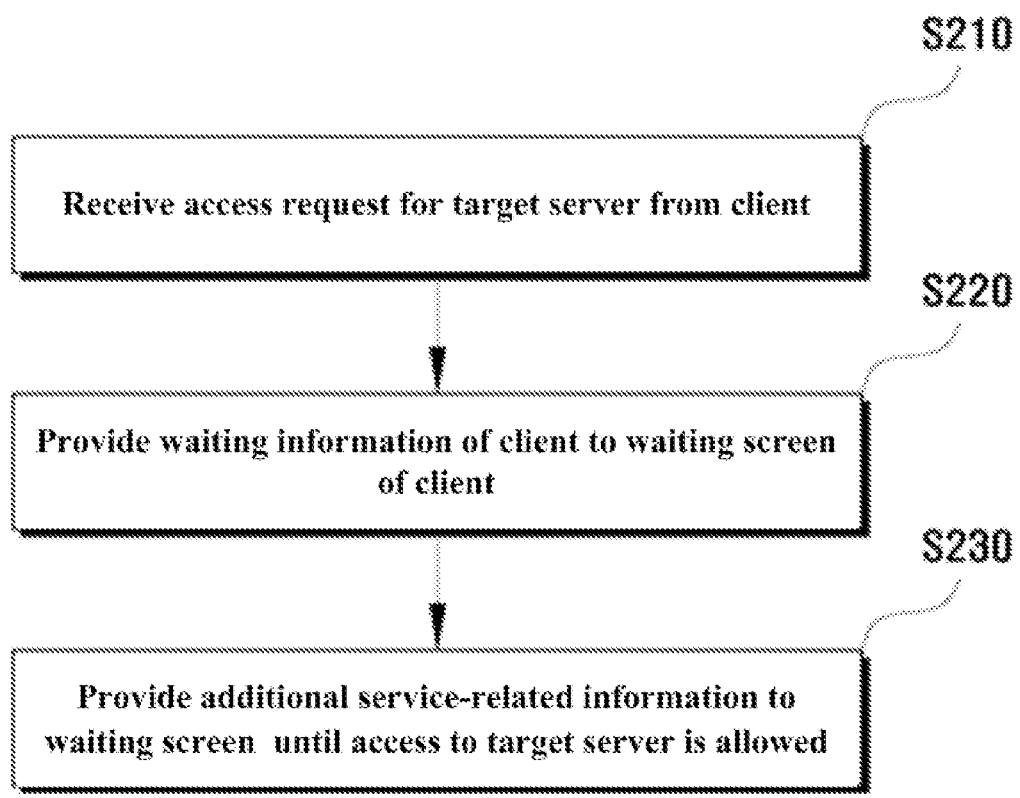
FIGS. 3 and 4 are flowcharts of a queue management method for providing information about an access waiting screen, according to an embodiment of the present disclosure.
Figure 4:
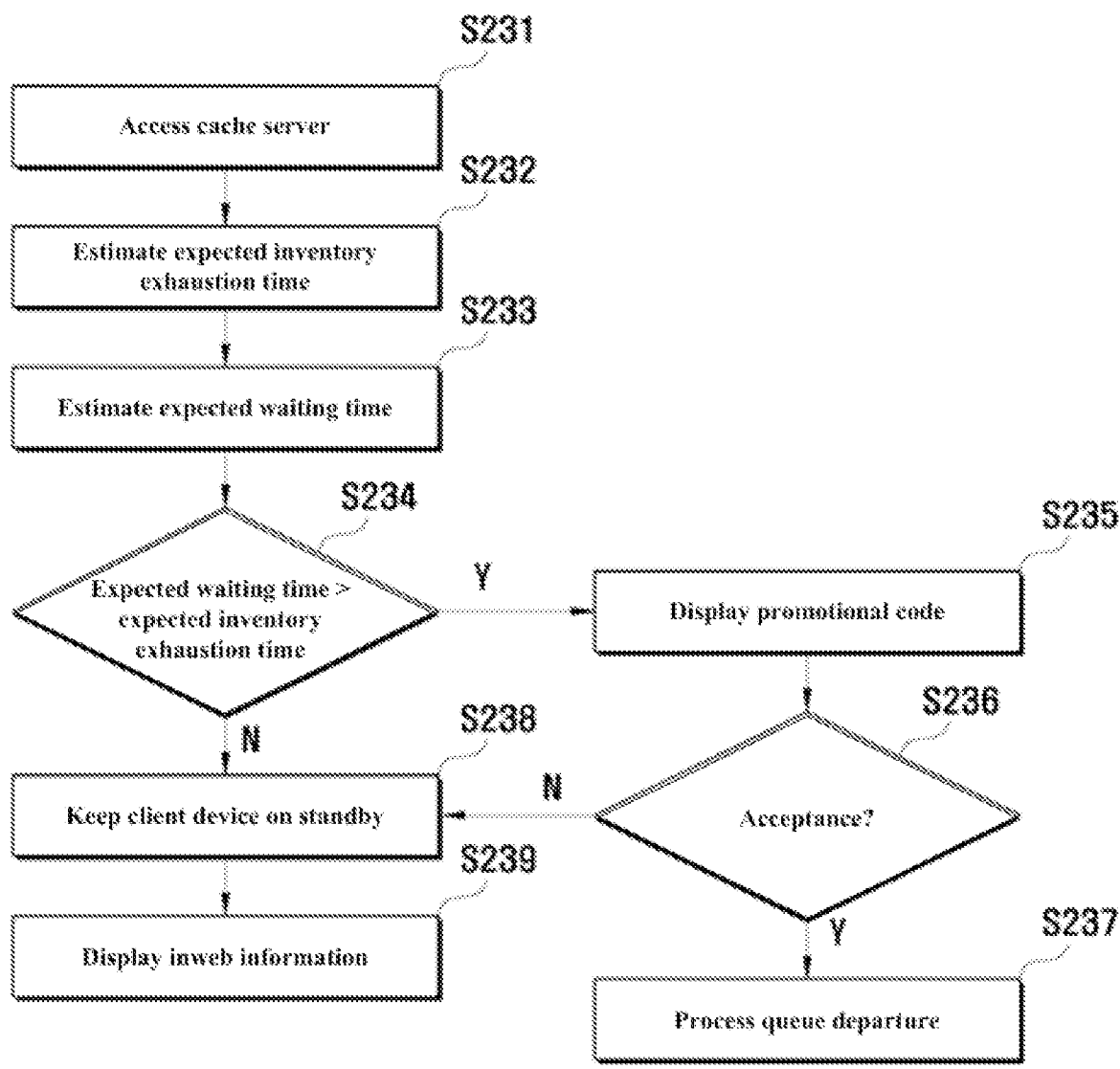

FIGS. 3 and 4 are flowcharts of a queue management method for providing information about an access waiting screen, according to an embodiment of the present disclosure. FIG. 5 is an example diagram for describing an access waiting screen displaying waiting information and additional information, according to an embodiment of the present disclosure. Methods of FIGS. 3 and 4 may be performed by the queue management device 100 disclosed in FIG. 2, but are not limited thereto. For example, they may be performed by the queue management server 10 disclosed in FIG. 1, or may be performed by the target server 30.

Furthermore, hereinafter, for convenience of description, although each of steps is described as being performed by the processor 130, each step may be understood as being performed by one module of the queue manager 131 and the encryptor 132 included in the processor 130. Alternatively, each step may be performed by components other than the queue manager 131 and the encryptor 132 (not shown).

Referring to FIG. 3, the processor 130 of the queue management device 100 may receive an access request for the target server 30 from the client device 20 (S210).

The processor 130 of the queue management device 100 may provide waiting information of the client device 20 to the waiting screen of the client device 20 based on the access request already received from the other client device 20 (S220).

Here, the waiting information may include a waiting order, the number of waiting people, and an expected waiting time. The waiting order may correspond to an order in which access requests received from the client device 20 are placed in the queue. The number of waiting people may correspond to the number of access requests already received from other client devices before the access request is received from the client device 20. The expected waiting time may be calculated based on a rate, at which the number of waiting people decreases, and the waiting order of the client device 20, but the calculation method is not limited thereto.

In detail, when receiving an access request from the client device 20, the processor 130 may place the access request at the end of the current queue. In other words, the queue management device 100 may give the waiting order to the client device 20 and may display the waiting order on a screen such that the corresponding access request corresponding to the order in the queue. For example, when the access request of the client device 20 is placed at the 51st order in the queue, the waiting order of the client device 20 may be 51.

Moreover, when the corresponding access request is placed in the queue, the processor 130 may display the number of users, which are waiting based on the client device 20, on the basis of the number of access requests, each of which the order is earlier than the placed location (order), and the number of access requests, each of which the order is later than the placed location (order).

Figure 5:
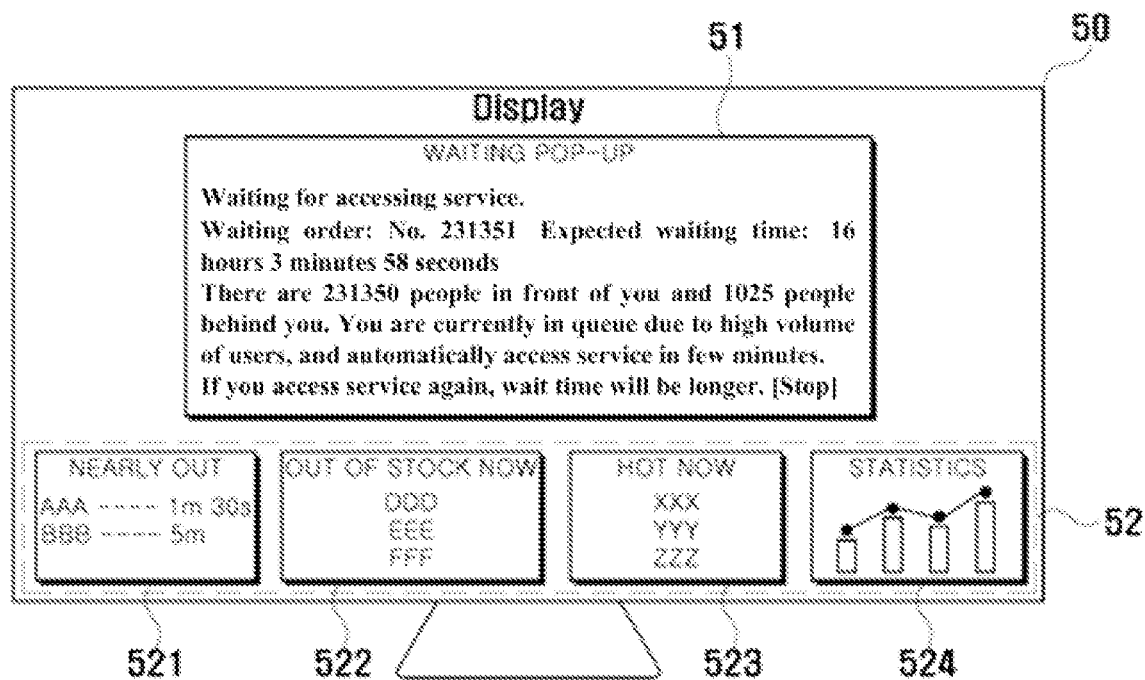
FIG. 5 is an example diagram for describing an access waiting screen displaying waiting information and additional information, according to an embodiment of the present disclosure.

FIG. 5 shows an access waiting screen 50 of the client device 20. The access waiting screen 50 includes waiting information 51. As shown in FIG. 5, users may identify the current waiting status by displaying waiting information in a pop-up form, and showing the expected waiting time, the number of waiting people, and waiting order.

The processor 130 of the queue management device 100 may provide additional service-related information to the waiting screen until access to the target server 30 is allowed for the client device 20 (S230).

Until the client device 20 placed in the queue enters the target server 30, the processor 130 may also display additional service-related information on an access waiting screen.

The processor 130 may collect information necessary to generate additional information from the target server 30 or the cache server 32 included in the target server 30. In detail, the processor 130 may inquire and collect personal information of users employing the service, purchase information of users employing the service, and real-time sales status information of products sold in the service from the target server 30 or the cache server 32.

The processor 130 may collect information necessary to generate additional information from the target server 30 or the cache server 32 through access permission to the target server 30 or the cache server 32 assigned to the queue management device 100. In other words, the queue management device 100 needs to be permitted to inquire and collect information about the target server 30 or the cache server 32, and thus information necessary to display additional information may be inquired and collected by accessing the target server 30 or the cache server 32 whenever necessary.

Here, the cache server 32 may be updated in a predetermined time unit. In other words, the necessary information may be updated at regular intervals such that the queue management device 100 is capable of generating accurate additional information. The reason that information is collected through the cache server 32 without directly accessing to the target server 30 is because minimal information is capable of being inquired without putting a load on the target server 30.

As shown in FIG. 5, an access waiting screen 50 includes additional service-related information 52. The additional information 52 may include product information and statistical information of users, which are changed as the users employ the service. Here, the product information changed as the service is used may include the product's expected inventory exhaustion time, the list of sold-out products, and the product's sales rate. Moreover, the statistical information may include statistical information by the age, gender, purchasing tendency, and purchase history of accessed users.

In addition, although not shown in FIG. 5, the additional information 52 may include a product inventory quantity and an inventory exhaustion speed.

According to an embodiment, when the service provided by the target server 30 is a service related to the sale of event products (one event product), the additional information may include at least one of the inventory quantity of event products, inventory exhaustion speed, and expected inventory exhaustion time.

Hereinafter, a specific process for providing inweb information (Inweb Info) on the access waiting screen when the service provided by the target server 30 is a service related to sales of event products will be described with reference to FIG. 4. Here, the inweb information may include waiting information and additional information.

As described above, the processor 130 may access the target server 30 or the cache server 32 to query and collect information necessary to provide the additional information (S231).

The processor 130 may estimate the expected inventory exhaustion time of event products based on the collected information (S232).

The processor 130 may estimate the expected waiting time of the client device 20 (S233). This is the same as a method of calculating the expected waiting time described in step S220.

The processor 130 may compare the expected waiting time with the expected inventory exhaustion time (S234).

When the expected waiting time is longer than the expected inventory exhaustion time, the processor 130 may provide a promotional code to the waiting screen of the client device 20 (S235).

In detail, when the expected waiting time is longer than the expected inventory exhaustion time, the processor 130 may provide the promotional code along with warning notification information on the waiting screen.

In other words, the processor 130 may provide the promotional code (or a discount coupon) while providing a user with the warning notification information that he/she may not purchase the event product. Here, the promotional code is a code to which a discount rate having a predetermined level is applied to another product being sold or scheduled to be sold within the event product or service. The promotional code may not be used during an event period, and may be used after the event ends to purchase the same product as the event product, or to purchase other products that are on sale or scheduled to be sold at a later date. As such, the client device 20 may be induced to deviate from the waiting queue, by providing the promotional code capable of being used in the future to users who are expected to fail in their purchase.

Above, it is described that the expected waiting time is determined by comparing the expected waiting time with the expected inventory exhaustion time, but is not limited thereto. For example, according to an embodiment, the processor 130 may compare the inventory quantity of event products with the number of waiting people. Moreover, when the number of waiting people is greater than the inventory quantity, the processor 130 may provide the promotional code along with the warning notification information on the waiting screen.

The processor 130 may determine whether to accept the promotional code of the client device 20 (S236).

When receiving the acceptance of the promotional code from the client device 20, the processor 130 may remove the client device 20 from the queue (S237).

As such, the queue management burden of the queue management device 100 may be reduced by terminating the access request of the client device 20 that accepted the promotional code (processing departure from a queue).

When the expected waiting time is shorter than the expected inventory exhaustion time, and the acceptance of the promotional code is not received from the client device 20 (when a rejection for the promotional code is received), the processor 130 may keep the client device 20 on standby (S238).

The processor 130 may display inweb information on the waiting screen of the client device 20 (S239). In other words, along with the waiting information of the client device 20, additional information including at least one of the inventory quantity, inventory exhaustion speed, and expected inventory exhaustion time of event products may be displayed.

In the meantime, after providing alternative service-related information to the waiting screen of the client device 20 of the present disclosure, the processor 130 may determine whether the client device 20 being waiting for access deviates from a queue. When the client device 20 deviates from the queue, the processor 130 may collect queue departure information.

As described above, when the client device 20 accepts an alternative service (i.e., a promotional code or a discount coupon), the client device 20 may deviate from the queue. The processor 130 may collect and analyze departure information in case of the departure from the queue due to acceptance of the alternative service. In detail, the processor 130 may analyze the type of an alternative service having the high acceptance rate when the alternative service is provided, an event product having a high acceptance rate, an acceptance rate for each gender, and an acceptance rate for each age. The analysis results are not limited thereto, and various analysis results may be extracted from the collected departure information.

Furthermore, the client device 20 may not accept the alternative service (i.e., a promotional code or a discount coupon) and may voluntarily leave the queue while waiting. The processor 130 may collect and analyze departure information in case of voluntary departure without accepting the alternative service. In detail, the processor 130 may analyze the type of the alternative service having the high voluntary departure rate when the alternative service is provided, an event product having the high voluntary departure rate, an average time maintained on standby, the duration spent on standby for each gender, and the duration spent on standby for each age. The analysis results are not limited thereto, and various analysis results may be extracted from the collected departure information.

The analysis results may be delivered to the target server 30. Afterward, the analysis results may be used when a point in time when another event product is planned, a point in time when an alternative service is planned, a point in time when setting the number of allowable entries to the target server 30, or a point in time when the alternative service is displayed on a waiting screen (i.e., a point in time when to provide an alternative service after the client device has been waiting for some time) is determined.

Above, it is described that a promotional code or discount coupon is provided as an alternative service to the waiting screen, but it is not limited thereto. For example, the processor 130 may provide advertisements or videos related to event products or products that are on sale or scheduled to be sold, as an alternative service.

According to an embodiment, when the service provided by the target server 30 is a service related to the sale of a plurality of products, the additional information may include at least one of the list of sold-out products among a plurality of products, a sales rate for respective products, an inventory quantity for respective products, an inventory exhaustion speed for respective products, and an expected inventory exhaustion time for respective products.

Referring to FIG. 5, the expected inventory exhaustion time of a product 521, a sold-out product list 522, a sales rate of the product 523, and statistical information 524 may be displayed as the additional information.

Here, the expected inventory exhaustion time 521 may be displayed only for products, of which the exhaustion time is within a predetermined time, from among the plurality of products. However, the expected inventory exhaustion time may be displayed for all products, but may not be limited thereto.

The sold-out product list 522 may include all sold-out products among the plurality of products.

In the case of the product sales rate 523, information about only the top three products having high real-time sales rates among the plurality of products may be displayed. However, the real-time sales rate may be displayed for all products, but may not be limited thereto.

According to an embodiment, the processor 130 may provide the waiting screen of the client device 20 with information and purchase buttons for unpopular products among the plurality of products. Moreover, when a purchase request for the unpopular product is received from the client device 20, the client device 20 may be allowed to directly enter the payment page for the unpopular product.

Here, the unpopular product may be a product having the lowest sales rate among the plurality of products.

Alternatively, the unpopular product may be determined based on log information of users by using the service. In other words, the unpopular product having low interest may be determined depending on log information including the number of clicks by users for each of the plurality of products, a time required to enter each product page and then to exit, and a time required to enter a product page and then to click a purchase button.

The processor 130 may induce the purchase of the unpopular product on the waiting screen by providing information about the unpopular product to the waiting client device 20.

When a purchase request for the unpopular product is received from the client device 20, the processor 130 may allow the client device 20 to directly enter the payment page for the unpopular product.

In this case, the processor 130 may manage an identification key for each page to prevent the client device 20, which has entered the payment page for an unpopular product, from moving to another page.

In other words, a different identification key is assigned to each page (a main page, a product page for each product, a payment page, or the like) of the service. When the client device 20 determines to purchase the unpopular product, the processor 130 may provide the client device 20 with an identification key for the page of the unpopular product. The identification key set for each page makes it impossible for the client device 20 to move from the purchase page of the unpopular product to another page.

FIGS. 3 and 4 illustrates that steps are performed sequentially. However, this is merely illustrative of the technical idea of the present disclosure. Those skilled in the art to which an embodiment of the present disclosure belongs may apply various modifications and variations by changing and performing the order of steps illustrated in FIGS. 3 and 4 or performing steps in parallel without departing from the essential characteristics of an embodiment of the present disclosure. The steps illustrated in FIGS. 3 and 4 are not limited to a time-series order.

In the meantime, in the above description, operations in FIGS. 3 and 4 may be further divided into additional operations or may be combined into fewer operations, according to an embodiment of the present disclosure. In addition, some steps may be omitted as necessary, and the order between steps may be changed.

Meanwhile, the disclosed embodiments may be implemented in a form of a recording medium storing instructions executable by a computer. The instructions may be stored in a form of program codes, and, when executed by a processor, generate a program module to perform operations of the disclosed embodiments. The recording medium may be implemented as a computer-readable recording medium.

The computer-readable recording medium may include all kinds of recording media in which instructions capable of being decoded by a computer are stored. For example, there may be read only memory (ROM), random access memory (RAM), magnetic tape, magnetic disk, flash memory, optical data storage device, and the like.

Disclosed embodiments are described above with reference to the accompanying drawings. One ordinary skilled in the art to which the present disclosure belongs will understand that the present disclosure may be practiced in forms other than the disclosed embodiments without altering the technical ideas or essential features of the present disclosure. The disclosed embodiments are examples and should not be construed as limited thereto.

According to the above-mentioned problem solving means of the present disclosure, usability of information may be increased by providing a waiting screen of a client device with various pieces of additional service-related information in addition to waiting information.

Moreover, the queue management burden of a queue management server may be reduced by providing a service capable of replacing a service for requesting access to a client device waiting to be accessed, and content that encourages users to reconnect later to induce queue departure.

Effects of the present disclosure are not limited to the effects mentioned above, and other effects not mentioned will be clearly understood by those skilled in the art from the following description.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A queue management device for providing information of an access waiting screen, the queue management device comprising:
   a communication unit;
   a display; and
   a processor configured to:
      control the display to display waiting information including an expected waiting time, a number of waiting people, and a waiting order, in a pop-up form, on a waiting screen of a respective client device of a plurality of client devices, based on access requests to a target server, received from the plurality of client devices through the communication unit; and
      provide additional information related to a service for product sales to the waiting screen until an access is permitted, wherein the additional information includes an inventory quantity, an inventory exhaustion speed, and an expected inventory exhaustion time of an event product when the service is a service related to sales of the event product,
   wherein the processor is further configured to:
      calculate an expected inventory exhaustion time of event product based on information collected by the processor from the target server or a cache server;
      calculate an expected waiting time of the client device, based on a rate, at which the number of waiting people decreases, and the waiting order;
      compare the expected waiting time with the expected inventory exhaustion time;
      when the expected waiting time is shorter than the expected inventory exhaustion time, keep the client device on standby and display the waiting information on the waiting screen of the client device; and
      when the expected waiting time is longer than the expected inventory exhaustion time, provide a promotional code to the waiting screen of the client device, receive a user input whether to accept the promotional code, and remove, from a queue, the client device that accepts the promotional code, and
   wherein the processor is further configured to perform a procedure of blocking, a procedure of detouring, and a procedure of entry permission management, for the plurality of client devices that request an entry into the target server,
   wherein the procedure of blocking comprises transmitting blocking information to one or more third client devices among the plurality of client devices to block a selection of a button displayed on the one or more third client devices for generating a specific action, when a number of accesses per second is at a macro level,
   wherein the procedure of detouring comprises promptly allowing an access of a particular client device to the target server even when the queue for waiting for entry to the target server is present, and
   wherein the procedure of entry permission management comprises managing a resource or status of the target server that provides a content service by controlling the entry based on a number of allowable entries, and the number of allowable entries is a number of client devices having issued key and being capable of simultaneously entering a specific transaction of the target server.

2. The queue management device of claim 1, wherein the additional information includes a list of sold-out products among a plurality of products and a sales rate for each of the plurality of products when the service is a service related to sales of the plurality of products.

3. The queue management device of claim 2, wherein the processor is further configured to:
   provide the waiting screen with a purchase button and information for an unpopular product among the plurality of products; and
   when a purchase request for the unpopular product is received from the client device, allow the client device to directly enter a payment page for the unpopular product.

4. A method performed by a processor of a device, the method comprising:
   when a request of access to a target server is received from a client device, displaying waiting information including an expected waiting time, a number of waiting people, and a waiting order, in a pop-up form, on a waiting screen of a respective client device of a plurality of client devices, based on access requests to the target server, received from the plurality of client devices; and providing additional information related to a product sales service to the waiting screen until the access is permitted, wherein the additional information includes an inventory quantity, an inventory exhaustion speed, and an expected inventory exhaustion time of an event product when the service is a service related to sales of the event product, wherein the providing the additional information comprises:

calculating an expected inventory exhaustion time of event product based on information collected from the target server or a cache server;

calculating an expected waiting time of the client device, based on a rate, at which the number of waiting people decreases, and the waiting order;

comparing the expected waiting time with the expected inventory exhaustion time;

when the expected waiting time is shorter than the expected inventory exhaustion time, keeping the client device on standby, and displaying the waiting information on the waiting screen of the client device;

when the expected waiting time is longer than the expected inventory exhaustion time, providing a promotional code to the waiting screen of the client device, receiving a user input whether to accept the promotional code, and removing, from a queue, the client device that accepts the promotional code;

performing a procedure of blocking, a procedure of detouring, and a procedure of entry permission management, for the plurality of client devices that request an entry into the target server, wherein the procedure of blocking comprises transmitting blocking information to one or more third client devices among the plurality of client devices to block a selection of a button displayed on the one or more third client devices for generating a specific action, when a number of accesses per second is at a macro level, wherein the procedure of detouring comprises promptly allowing an access of a particular client device to the target server even when the queue for waiting for entry to the target server is present, and wherein the procedure of entry permission management comprises managing a resource or status of the target server that provides a content service by controlling the entry based on a number of allowable entries, and the number of allowable entries is a number of client devices having issued key and being capable of simultaneously entering a specific transaction of the target server.

5. The method of claim 4, wherein the additional information includes a list of sold-out products among a plurality of products and a sales rate for each of the plurality of products when the service is a service related to sales of the plurality of products.

6. The method of claim 5, wherein the providing the waiting information comprises:

displaying the waiting screen with a purchase button and information for an unpopular product among the plurality of products; and when a purchase request for the unpopular product is received from the client device, allow the client device to directly enter a payment page for the unpopular product.

7. A non-transitory computer-readable recording medium, coupled with a hardware processor, for performing the method of claim 4.

* * * * *